United States Patent
Meador et al.

[11] Patent Number: 5,590,619
[45] Date of Patent: Jan. 7, 1997

[54] HOLDER FOR A BOAT SEAT CLAMP ASSEMBLY

[76] Inventors: Thomas R. Meador, 7876 Kirkwood Cove, Olive Branch, Miss. 38654; Carl D. Gilmer, Jr., 782 Watson, Memphis, Tenn. 38111

[21] Appl. No.: 517,126

[22] Filed: Aug. 21, 1995

[51] Int. Cl.⁶ .................................................. B63B 17/00
[52] U.S. Cl. .......................... 114/363; 248/500; 297/252; 403/381
[58] Field of Search ........................... 248/503.1, 222.11, 248/225.11, 225.21, 304, 500; 297/252, 352; 114/363; 403/381

[56] References Cited

U.S. PATENT DOCUMENTS

| | | | |
|---|---|---|---|
| 291,389 | 1/1884 | Newacheck | 248/503.1 |
| 358,895 | 3/1887 | Shuman | 248/503.1 |
| 1,061,752 | 5/1913 | Kesselhuth | 248/503.1 |
| 1,650,315 | 11/1927 | Alles | 297/252 X |
| 2,405,685 | 8/1946 | Cantrell | 304/24 |
| 3,591,112 | 7/1971 | Garmhausen | 248/226 B |
| 3,789,444 | 2/1974 | McCord | 14/363 |
| 3,821,825 | 7/1974 | Bailey | 14/363 |
| 4,138,094 | 2/1979 | Thir | 403/381 X |
| 4,281,426 | 8/1981 | Moeser | 14/363 |
| 4,432,525 | 2/1984 | Duvall | 248/430 |
| 4,729,336 | 3/1988 | Rohne | 297/252 X |
| 4,766,838 | 8/1988 | Johnson | 297/252 X |
| 4,802,708 | 2/1989 | Vos et al. | 297/252 |
| 5,152,571 | 10/1992 | Kohler | 248/503.1 X |

Primary Examiner—Ramon O. Ramirez
Attorney, Agent, or Firm—Walker, McKenzie & Walker, P.C.

[57] ABSTRACT

A holder for a boat seat clamp assembly. The holder includes a hook for embracing the transverse arm of a first clamp of the boat seat clamp assembly to prevent undesired separation of the first clamp from the boat. A modified second clamp includes a latch for engaging a lip on a transverse member of the boat to prevent undesired separation of the second clamp from the boat.

9 Claims, 1 Drawing Sheet

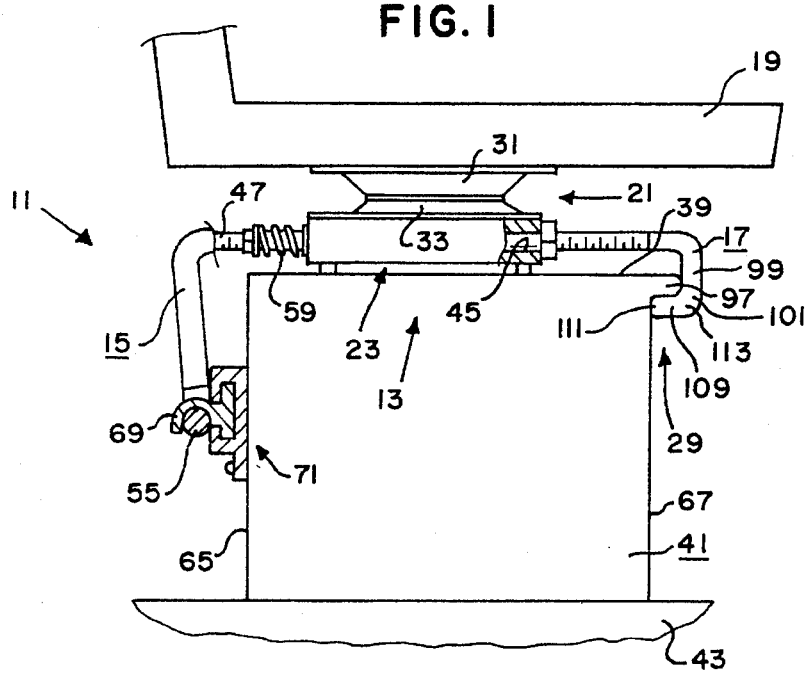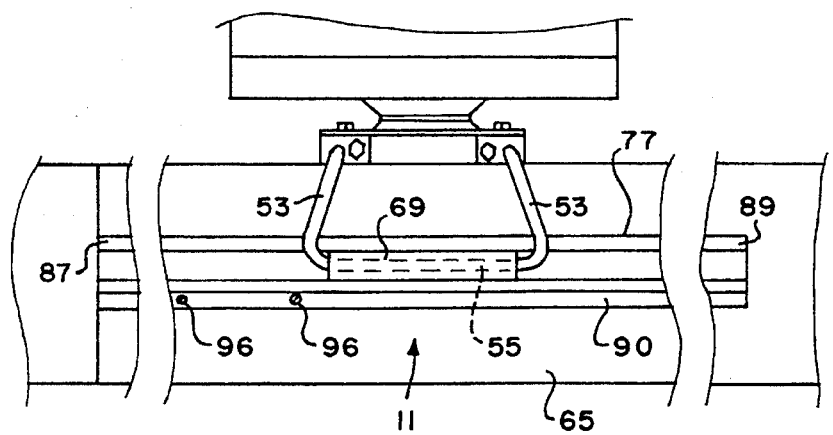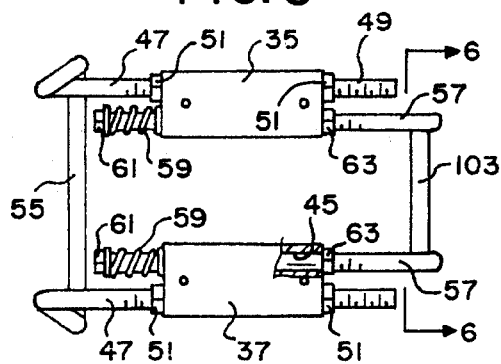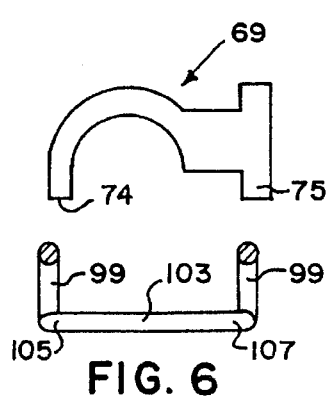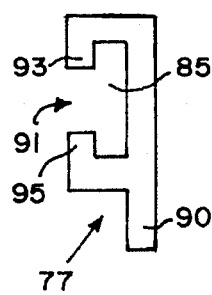

HOLDER FOR A BOAT SEAT CLAMP ASSEMBLY

BACKGROUND OF THE INVENTION

1. Field of the Invention

The present invention relates, in general, to holding means for holding a boat seat clamp assembly onto a boat.

2. Information Disclosure Statement

It is known in the prior art to provide a seat clamp assembly for holding a seat onto the transverse member or so called "tank" of a boat of the type used for fishing. Such boats are sometimes known as "Jon boats". In such boats in the past, the fisherman's seat;, which may be provided with a swivel mechanism, has been clamped onto the transverse member by means of a seat clamp assembly that includes a pair of clamps which are adjusted by nuts to respectively engage the front and rear panels of the transverse member and clamp the transverse member therebetween. The above mentioned adjustment has been difficult to accomplish. However, such seat clamp assemblies have not been capable of holding onto the transverse member during certain times, as for example, when the fisherman is pulling in a fish and leans back on the seat. This can endanger the fisherman and cause him to fall overboard when the clamp assembly breaks loose from the transverse member.

It is therefore desirable to have a means for securely holding the clamps of a seat boat assembly onto the transverse member of a boat.

A preliminary patentability search in Class 114, subclasses 363; class 70, subclass 232; and class 297, subclass 252, produced the following patents, some of which may be relevant to the present invention: Cantrell, U.S. Pat. No. 2,405,685, issued Aug. 13, 1946; Garmhausen, U.S. Pat. No. 3,591,112, issued Jul. 6, 1971; McCord, U.S. Pat. No. 3,789,444, issued, Feb. 5, 1974; Bailey, U.S. Pat. No. 3,821,825, issued Jul. 2, 1974; Moeser, U.S. Pat. No. 4,281,426, issued, Aug. 4, 1981; Duvall, U.S. Pat. No. 4,432,525 issued Feb. 21, 1984; and Vos et al, U.S. Pat. No. 4,802,708, issued, Feb. 7, 1989.

SUMMARY OF THE INVENTION

The present invention is a holding means for holding a boat seat clamp assembly onto the transverse member of a boat, and includes, in general, hook means for embracing a portion of a first clamp of the seat clamp assembly and fastening means for attaching to the hook means and to the transverse member to prevent undesired separation of the first clamp from the transverse member.

It is an object of the present invention to provide means for positively preventing unwanted separation of a seat clamp assembly from the transverse member of a boat during normal use of the seat clamp assembly.

A further object of the present invention is to correct unsafe problems with some of the prior seat clamp assemblies.

A further object is to improve upon a second clamp of boat seat clamp assemblies by providing latching means for latching the second clamp beneath a lip on the transverse member of the boat.

A further object is to provide easy and convenient means for modifying existing boat clamp assemblies to make them safe for use.

BRIEF DESCRIPTION OF THE DRAWINGS

FIG. 1 is a somewhat diagrammatic side view of the clamp holding means of the present invention with parts broken away and shown in section, and with the clamp holding means shown in combination with a seat clamp assembly and portions of a boat.

FIG. 2 is a front elevational view on a reduced scale of that shown in FIG. 1.

FIG. 3 is a plan view of the modified seat clamp assembly of the present invention.

FIG. 4 is a side view of the hook means and base member of the clamp holding means of the present invention.

FIG. 5 is a side view of the holder means of the clamp holding means of the present invention.

FIG. 6 is a sectional view taken as on line 6—6 of FIG. 3.

DESCRIPTION OF THE PREFERRED EMBODIMENT

Referring to FIGS. 1–6, the holding means 11 of the present invention is shown in use with a modified boat seat clamp assembly 13. Seat clamp assembly 13 includes a first clamp 15 and a modified second clamp 17. It should be understood that the term "seat clamp assembly 13" or "boat seat clamp assembly 13" includes a boat seat 19 of suitable well known construction, as well as the usual swivel mechanism 21, housing 23, first clamp 15, and/or modified second clamp 17, and spring means for urging first and second clamps 15,17 towards one another. The only difference between seat clamp assembly 13 and prior seat clamp assemblies of known construction relates to the addition of the spring means and to the latching means 29 included in the second clamp 17, which will be better understood in the description thereof to follow later in the specification.

For a better understanding of the use and function of the present invention and its relationship to the prior art, the well known prior art seat clamp assembly and its structure and function will now be described in more detail. The boat seat 19 is fixedly attached to the upper half 31 of swivel mechanism 21. The lower half 33 of swivel mechanism 21 is fixedly attached by suitable means, not shown, to housing 23, which has two halves 35, 37 and which in turn rests on the top panel 39 of the transverse member 41 of a boat 43. There are four bores 45, i.e. two in each of housing halves 35, 37, extending through housing 23. The outermost bores 45 in each of the housing halves 35, 37, respectively receive the horizontal legs 47 of first clamp 15. There are threaded portions 49 on legs 47 upon which are provided nuts 51 on opposite ends of housing 23 to adjust the amount of extension of first clamp 15 relative to housing 23. First clamp 15 in addition to horizontal legs 47 includes a pair of depending legs 53 respectively integrally attached at the upper ends thereof to the ends of legs 47 and at the lower ends thereof are respectively integrally attached at the opposite ends of a transverse arm 55, which also forms a part of first clamp 15. The innermost bores 45 in each of the housing halves 35, 37 respectively receive the horizontal legs 57 of second clamp 17. Horizontal legs 57 are movable endwise relative to housing 23 and are urged to the left as viewed in FIG. 3 by spring means such as springs 59 respectively acting between the ends of housing halves 35, 37 and nuts 61 provided on the ends of horizontal legs 57. Another set of nuts 63 are provided on legs 57 on the opposite ends of housing halves 35, 37 from nuts 61 to limit movement of second clamp 17 to the left as viewed in FIG. 3.

In the prior art seat clamp assemblies, the clamp corresponding to second clamp 17 is substantially the same as that hereinabove described relative to first clamp 15. However, modified clamp 17 of the present invention is preferably different from first clamp 15 as will be seen in the description to follow later in the specification.

In the use of prior art seat clamp assemblies, with housing 23 resting on top panel 39 the transverse arms (corresponding to transverse arm 55) of the two clamps (like clamp 15) engaged opposite depending panels 65, 67 of transverse member 41 in an attempt to hold the seat assembly on the transverse member 41, but as heretofore pointed out prior seat assemblies have not been capable of holding onto the transverse member during certain times.

Referring now to the holding means 11 of the present invention, holding means 11 includes, in general, hook means 69 for embracing transverse arm 55 of first clamp 15 and fastening means 71 attached to hook means 69 and for fixedly attaching to first panel 65 to prevent undesired separation of first clamp 15 from first panel 65. Hook means 69 is preferably shaped as best seen in FIG. 4, wherein it will be seen hook means 69 is turned downwardly and terminates in an edge 74. Base member 75 is preferably T-shaped as viewed from the end thereof as best seen in FIG. 4 and is preferably elongated and coextensive with hook means 69. Base member 75 and hook means 69 are preferably an integral extrusion of suitable material, such as metal or plastic. Similarly, holder means 77 is preferably an extrusion which defines a T-shaped slot 85 extending transversely of holder means 77 from end-to-end thereof and is adapted to closely slidably receive T-shaped base member 75 through one of the ends 87, 89 of holder means 77. There is a depending portion 90 provided on holder means 77. Also, there is a narrow neck portion 91 of slot 85 established by lip portions 93, 95 which prevents removal of T-shaped base member 75 from T-shaped slot 85 except through one of the ends 87, 89. The lengths of hook means 69 and base member 75 are preferably shorter than holder means 77, as best seen in FIG. 2.

It is contemplated that clamp holding means 11 and second clamp 17 may be, but not necessarily, sold separately from existing prior art clamp assemblies so that existing prior art clamp assemblies may be converted to safer devices by the addition of either one or both clamp holding means 11 and second clamp 17 to the existing prior art seat clamp assemblies. Thus, clamp holding means 11 and second clamp 17 may be sold in kit form for the above mentioned conversion.

In assembling clamp holding means 11 with an existing prior art seat clamp assembly the following steps may be used: (1) Place hook means 69 over transverse arm 55, (2) Slide base member 75 end-wise into T-shaped slot 85 through one of the ends 87, 89 of holder means 77 until base member 75 is centered relative to holder means 77, and (3) Attach holder 77 to one of panels 65, 67 by suitable attaching means, such as screws 96 or the like. It will be understood that step (3) may be accomplished before steps (1) and (2) without departing from the spirit and scope of the present invention.

Referring now to modified second clamp 17, as best seen in FIGS. 1, 3, & 6, second clamp 17 includes latching means 29 for latching second clamp 17 beneath a lip 97 to prevent undesired separation of second clamp 17 from panel 67 of transverse member 41. Lip 97 is commonly provided on transverse member 41. Second clamp 17 includes a pair of spaced apart depending portions 99 respectively having lower ends 101, a second transverse arm 103 having a first end 105 and a second end 107, and a pair of stub portions 109 respectively having inner ends 111 and outer ends 113. The outer ends 113 of stub portions 109 (i.e., the ends to the right as viewed in FIG. 1) are respectively integrally attached to the lower ends 101 of depending portions 99. Stub portions 109 respectively extend from outer ends 113 towards first clamp 15 and terminate respectively in inner ends 111. The first end 105 of second transverse arm 103 is integrally attached to the inner end 111 of one of stub portions 109 and the second end 107 of second transverse arm 103 is integrally attached to the inner end 111 of the other of stub portions 109.

When second clamp 17 is in the latched position relative to lip 97, as best seen in FIG. 1, the inner ends 111 of stub portions 109 and second transverse arm 103 extend beneath lip 97 so that seat clamp assembly 13 is prevented from tilting counterclockwise as viewed in FIG. 1. Thus, with a fisherman sitting in boat seat 19 and leaning back to pull in a fish, clamp holding means 11 would prevent undesired detachment of seat clamp assembly 13 from transverse member 41. By the same token, if boat seat 19 were turned 180° from that shown in FIG. 1 and the fisherman was leaning back to pull in a fish, clamp holding means 11 would prevent seat clamp assembly 13 from tilting clockwise as viewed in FIG. 1 and prevent undesired detachment of seat clamp assembly 13 from transverse member 41.

In installing a seat clamp assembly 13 on transverse member 41 that has included therein a modified second clamp 17 and even after clamp holding means 11 has been installed, the remaining steps of the installation of seat clamp assembly 13 may be accomplished by pulling outwardly on second clamp 17 against the force of springs 59 while the seat clamp assembly 13 is tilted upwardly about the longitudinal axis of arm 55 so that latching means 29 is outwardly beyond lip 97, whereupon the clamp assembly 13 may be rotated clockwise downwardly and then second clamp 17 released to permit second transverse arm 103 to pass into a latched position beneath lip 97.

Although the present invention has been described and illustrated with respect to a preferred embodiment and a preferred use therefor, it is not to be so limited since modifications and changes can be made therein which are within the full intended scope of the invention.

We claim:

1. Holding means for use in holding a seat clamp assembly of the type including a first clamp having a first transverse arm onto a boat of the type including a transverse member having a top panel, and first and second spaced panels depending from said top panel, said holding means comprising:
    (a) hook means for embracing said first transverse arm of said first clamp; and
    (b) means for attaching to said hook means and for attaching to said first panel to prevent undesired separation of said first clamp from said first panel including:
        i. a base member fixedly attached to said hook means,
        ii. holder means having a slot for slidably receiving said base member, and
        iii. attaching means for fixedly attaching said holder means to said first panel.

2. The holding means of claim 1 in which said slot extends transversely of said holder means from end-to-end thereof and adapted to slidably receive said base member through one of the ends of said holder means.

3. Holding means for use in holding a seat clamp assembly of the type including a first clamp having a first transverse arm onto a boat of the type including a transverse member having a top panel, and first and second spaced panels depending from said top panel, said holding means comprising:

(a) hook means for embracing said first transverse arm of said first clamp;

(b) means for attaching to said hook means and for attaching to said first panel to prevent undesired separation of said first clamp from said first panel including:
  i. a base member fixedly attached to said hook means, said base member being T-shaped in cross section,
  ii. holder means for slidably receiving said base member, said holder means defining a T-shaped slot extending transversely of said holder means from end-to-end thereof and adapted to slidably receive said T-shaped base member through one of the ends of said holder means, and
  iii. attaching means for fixedly attaching said holder means to said first panel.

4. In combination, a boat including a transverse member including a first panel, a top panel and a second panel, a lip provided on said transverse member extending outwardly of the second panel of the transverse member of said boat, and a seat clamp assembly including:

(a) a first clamp having a first transverse arm, (b) a second clamp, (c) spring means for urging said first and second clamps towards one another:

(d) holding means for holding said seat clamp assembly onto said boat, said holding means including:
  i. a base member fixedly attached to said hook means,
  ii. holder means having a slot for slidably receiving said base member; and (e) latching means for latching said second clamp beneath said lip to prevent undesired separation of the second clamp from the transverse member of the boat.

5. The combination of claim 4 in which said latching means includes:

(a) a pair of depending portions respectively having lower ends, (b) a second transverse arm having a first end and a second end, (c) a pair of stub portions respectively having outer ends and inner ends, said outer ends of said stub portions being respectively attached to said lower ends of said depending portions, said stub portions respectively extending from said outer ends thereof towards said first clamp with said inner ends extending beneath said lip, said first end of said second transverse arm being integrally attached to the inner end of one of said stub portions, and the second end of said second transverse arm being integrally attached to the inner end of the other of said stub portions.

6. In combination, a boat including a transverse member including a first panel, a top panel and a second panel; a boat seat clamp assembly including a first clamp having a transverse arm, a second clamp having a second transverse arm, spring means for urging said first and second clamps towards one another; and holding means for holding said seat clamp assembly onto said boat, said holding means comprising:

(a) hook means embracing said first transverse arm, and (b) means attached to said hook means and attached to said first panel to prevent undesired separation of said first clamp from said first panel including:
  i. a base member fixedly attached to said hook means.
  ii. holder means having a slot for slidably receiving said base member, and
  iii. attaching means for fixedly attaching said holder means to said first panel.

7. In combination, a boat including a transverse member including a first panel, a top panel and a second panel; a boat seat clamp assembly including a first clamp having a transverse arm, a second clamp having a second transverse arm, spring means for urging said first and second clamps towards one another: and holding means for holding said seat clamp assembly onto said boat, said holding means comprising:

(a) hook means embracing said first transverse arm, and (b) means attached to said hook means and attached to said first panel to prevent undesired separation of said first clamp from said first panel, said means attached to said hook means and attached to said first panel including a base member fixedly attached to said hook means, holder means slidably receiving said base member, and attaching means fixedly attaching said holder means to said first panel, said base member being T-shaped in cross section, and said holder means defining a T-shaped slot extending transversely of said holder means from end-to-end thereof and slidably receiving said T-shaped base member through one of the ends of said holder means.

8. The combination of claim 7 in which said type of said boat includes a lip provided on said transverse member extending outwardly of said second panel of the transverse member of said boat, the improvement in said second clamp in which said second clamp includes latching means latching said second clamp beneath said lip to prevent undesired separation of the second clamp from the transverse member of the boat.

9. The combination of claim 8 in which said latching means includes:

(a) a pair of depending portions respectively having lower ends, (b) a second transverse arm having a first end and a second end, (c) a pair of stub portions respectively having outer ends and inner ends, said outer ends of said stub portions being respectively attached to said lower ends of said depending portions, said stub portions respectively extending from said outer ends thereof towards said first clamp with said inner ends extending beneath said lip, said first end of said second transverse arm being integrally attached to the inner end of one of said stub portions, and the second end of said second transverse arm being integrally attached to the inner end of the other of said stub portions.

* * * * *